United States Patent
Hosseini et al.

(10) Patent No.: US 11,502,406 B2
(45) Date of Patent: Nov. 15, 2022

(54) PHASED ARRAY ORIENTATION FINDING METHOD

(71) Applicant: Blue Danube Systems, Inc., New Providence, NJ (US)

(72) Inventors: Seyedamirhossein Hosseini, Jersey City, NJ (US); Farideddin Fayazbakhsh, Chatham, NJ (US); Rohan Gupte, Basking Ridge, NJ (US)

(73) Assignee: Blue Danube Systems, Inc., New Providence, NJ (US)

( * ) Notice: Subject to any disclaimer, the term of this patent is extended or adjusted under 35 U.S.C. 154(b) by 522 days.

(21) Appl. No.: 16/731,152

(22) Filed: Dec. 31, 2019

(65) Prior Publication Data

US 2020/0227825 A1    Jul. 16, 2020

Related U.S. Application Data

(60) Provisional application No. 62/790,636, filed on Jan. 10, 2019.

(51) Int. Cl.
*H01Q 3/26*    (2006.01)

(52) U.S. Cl.
CPC .................. *H01Q 3/267* (2013.01)

(58) Field of Classification Search
CPC ...................................... H01Q 3/267
See application file for complete search history.

(56) References Cited

U.S. PATENT DOCUMENTS

| 10,091,662 B1 | 10/2018 | Bendlin et al. |
| 2015/0326300 A1 | 11/2015 | Fujii |

FOREIGN PATENT DOCUMENTS

| CN | 108288991 A | * 7/2018 |
| CN | 108710758 A | * 10/2018 |

* cited by examiner

*Primary Examiner* — Bernarr E Gregory
*Assistant Examiner* — Fred H Mull
(74) *Attorney, Agent, or Firm* — Occhiuti & Rohlicek LLP

(57) ABSTRACT

A method of determining an orientation of a phased array antenna that involves positioning a communication device in front of the phased array antenna; with the phased array antenna, sequentially generating each beam pattern of a library of multiple beam patterns; for each of the sequentially generated beam patterns from the library of multiple beam patterns, measuring a received signal parameter, wherein the received signal parameters for the library of multiple transmit beam patterns form a measured received signal vector for the phased array antenna; and determining the orientation of the phased array antenna by comparing the measured received signal vector for the phased array antenna to each of a plurality of calculated received signal vectors.

18 Claims, 5 Drawing Sheets

PHASED ARRAY ORIENTATION FINDING METHOD

This application claims the benefit under 35 U.S.C. 119(e) of Provisional Application Ser. No. 62/790,636, filed Jan. 10, 2019, entitled "Phased Array Orientation Finding," the entire contents of which are incorporated herein by reference.

TECHNICAL FIELD

The present invention is directed to methods for determining the orientation of a phased array antenna.

BACKGROUND

If phased arrays are used for cellular communications, they need to be mounted and installed on cell towers. In order to achieve proper RF-Planning performance, any RF-Planning tool needs to be aware of accurate values for the horizontal and vertical orientation of the phased array, i.e., the geographical direction of where the phased array panel is pointing at. However, due to practical complications that occur during installation, tower crew members are often unable to place the phased array exactly at the intended orientation. As a result, RF-Planning, network and system level simulations are performed based on inaccurate data, which in turn leads to unreliable simulation results. Network operators struggle with this problem to the extent that they acquire external, often expensive devices to indicate the correct orientation, with differing levels of accuracy.

In the following, a procedure which enables one to accurately determine the correct orientation of a phased array using successive beamforming is described.

SUMMARY

In general, in one aspect, the invention features a method of determining an orientation of a phased array antenna. The method involves: positioning a communication device in front of the phased array antenna; with the phased array antenna, sequentially generating each beam pattern of a library of multiple beam patterns; for each of the sequentially generated beam patterns from the library of multiple beam patterns, and by using either the phased array antenna or the communication device, measuring a received signal parameter, wherein the received signal parameters for the library of multiple transmit beam patterns form a measured received signal vector for the phased array antenna; and determining the orientation of the phased array antenna by comparing the measured received signal vector for the phased array antenna to each of a plurality of calculated received signal vectors.

Other embodiments include one or more of the following features. The method also involves determining location coordinates for the communication device and for the phased array antenna. Each calculated received signal vector of the plurality of calculated received signal vectors corresponds to a different hypothesized orientation for the phased array antenna. The method also involves for each hypothesized orientation of a plurality of hypothesized orientations for the phased array antenna, using the beam library to compute the corresponding calculated received signal vector for that hypothesized orientation. The library of multiple beam patterns is a library of multiple transmit beam patterns or alternatively it is a library of multiple receive beam patterns. The communication device is a receiving device and measuring the received signal parameter is performed at the communication device or, alternatively, it is a transmitting device and measuring the received signal parameter is performed at the phased array antenna. Determining the orientation of the phased array antenna involves comparing the measured received signal vector for the phased array antenna to each calculated received signal vector of the plurality of calculated received signal vectors to determine an angle of departure or arrival for the phased array antenna. It also involves converting the angle of departure or arrival for the phased array to the orientation of the phased array antenna. Comparing the measured received signal vector for the phased array antenna to each calculated received signal vector of the plurality of calculated received signal vectors involves finding which calculated received signal vector among the plurality of calculated received signal vectors yields a best fit with the measured received signal vector. Comparing the measured received signal vector for the phased array antenna to each calculated received signal vector of the plurality of calculated received signal vectors involves employing a pattern matching algorithm. The pattern matching algorithm employs a least squares technique. The received signal parameter is RSRP (Reference Signal Received Power) or SINR (Signal-to-Interference plus Noise Ratio). The method further involves: defining the library of multiple different beam patterns; and storing the library of multiple different beam patterns.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
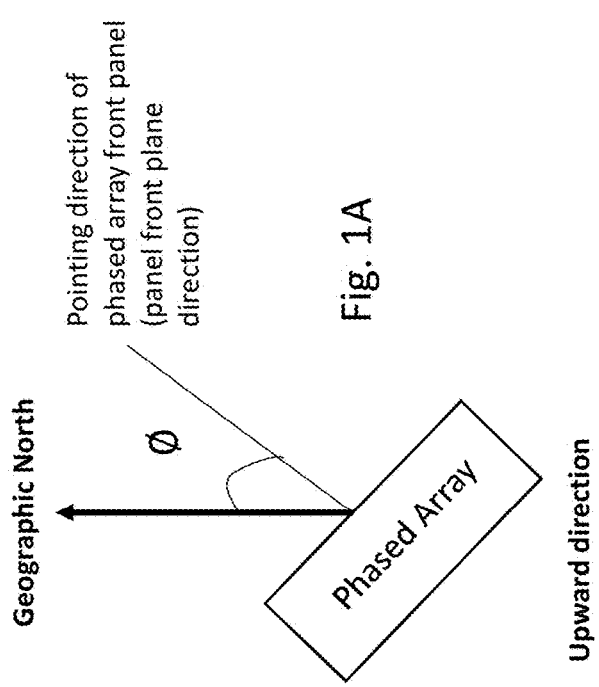
FIG. 1A is a view from above showing the horizontal angle of a phased array.
Figure 1B:
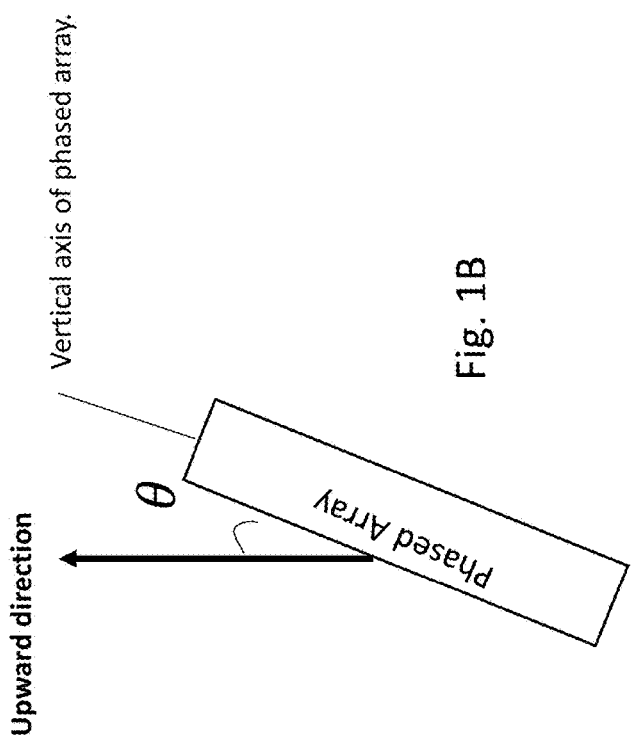
FIG. 1B is a view from the side showing the vertical orientation of a phased array.

The algorithm described herein determines the horizontal and vertical orientation of a phased array. Referring to FIG. 1A, which shows a view of the phased array from above, the horizontal orientation is the angle between the pointing direction of the phased array and geographic north. And referring to FIG. 1B, which shows a view of the phased array from the side, the vertical orientation is the angle between the vertical axis of the phased array and the upward direction (perpendicular to the ground).

Figure 2A:
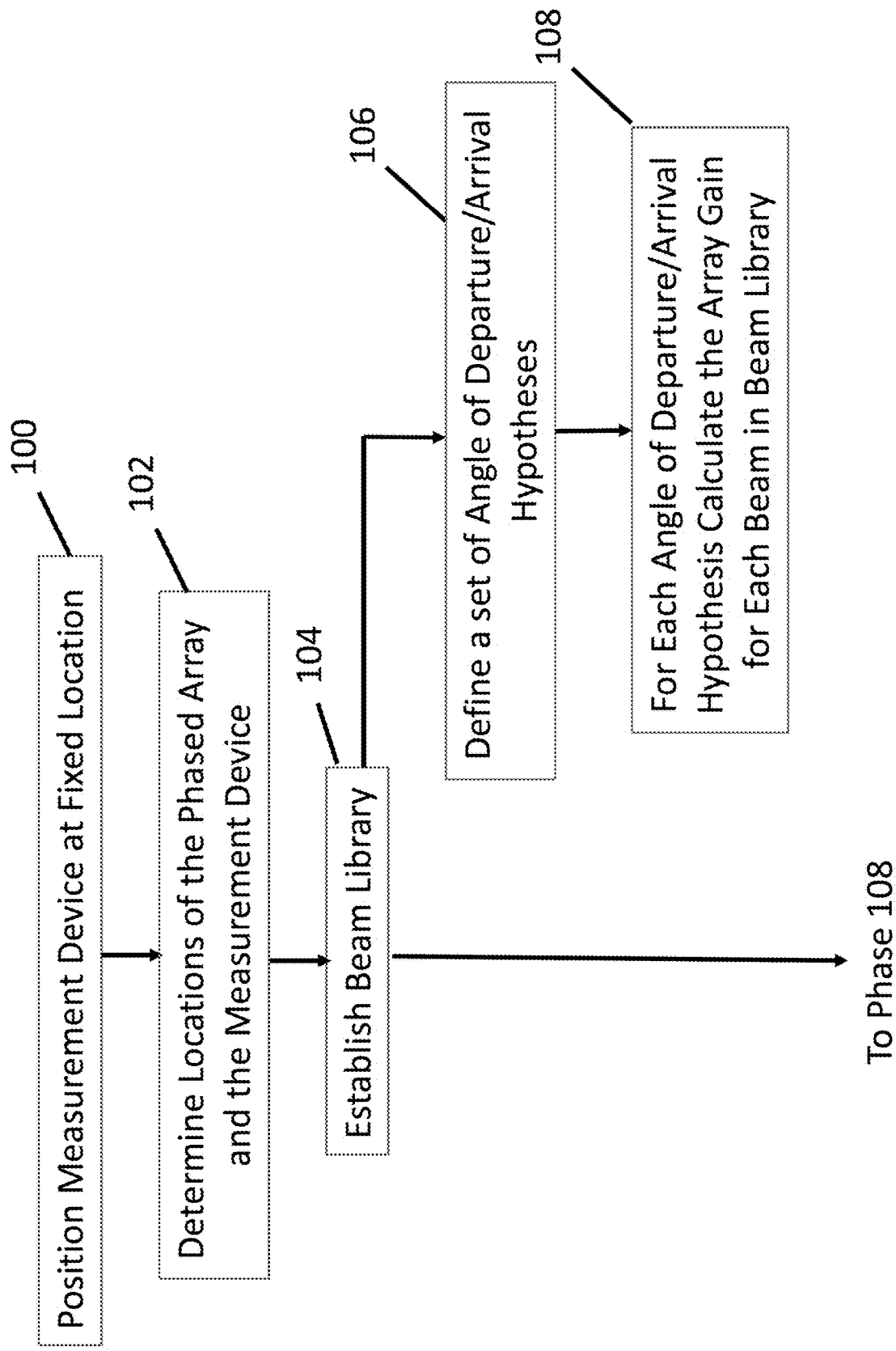
FIGS. 2A-B present a flow chart of a procedure for determining the orientation of a phased array.
Figure 2B:
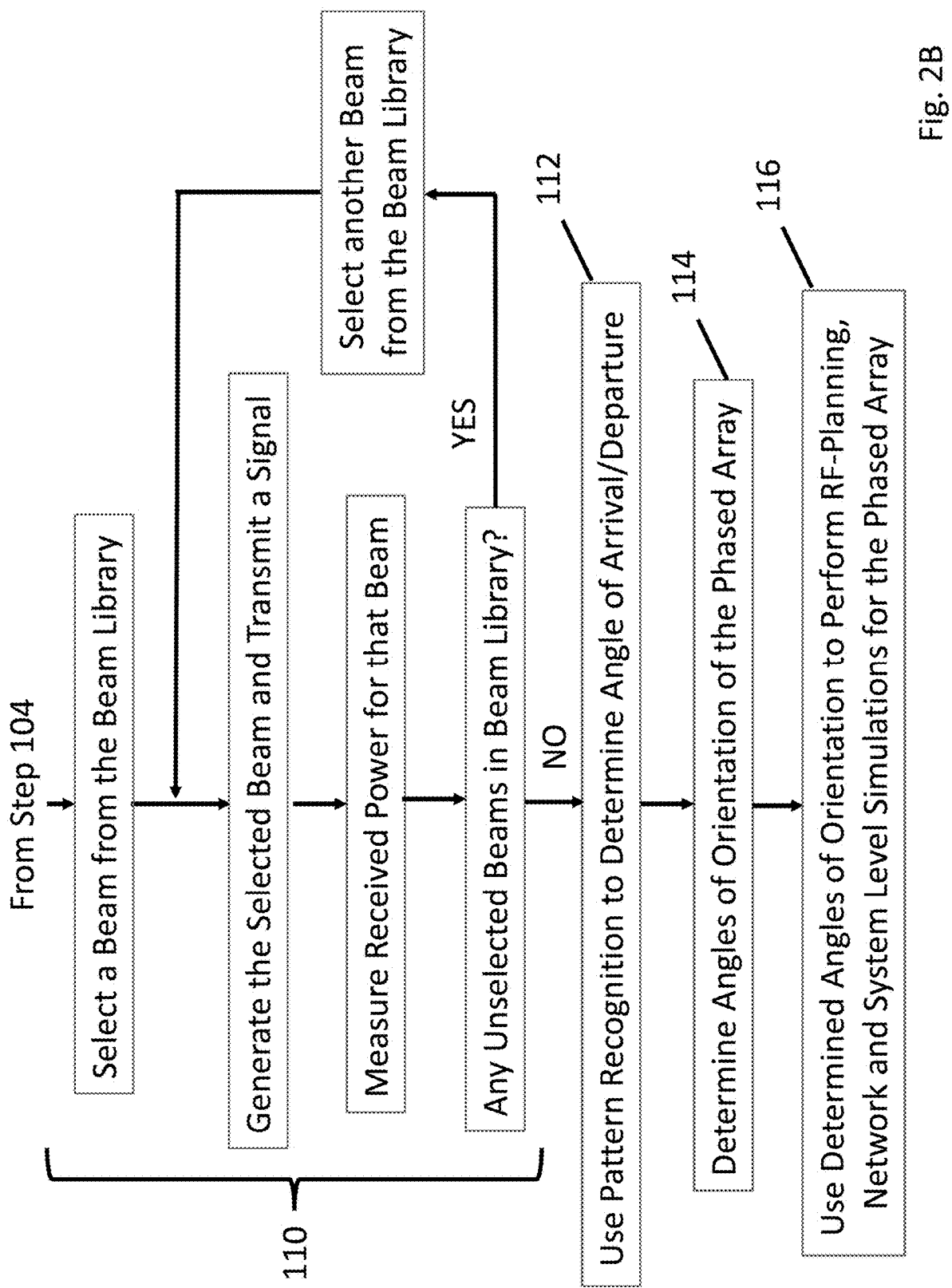

Referring to FIGS. 2A-B, the described embodiment, which is an algorithm for determining the horizontal and vertical orientation of a phased array, begins with placing a measurement device (see device 200 in FIGS. 6, 7, and 8) that is capable of measuring RF signal power, such as a mobile phone, at a fixed location (step 100). The ideal location of the device should preferably satisfy certain conditions:
1. It should be placed at an angle that is visually not too far off from the front of the phased array. For instance, it should not be put at the back of the phased array.
2. It should be at a distance at which we can be sure that the beam of the phased array is accurately generated. Also, the distance should not be too much so that the signal is not received. Hence, the proper distance should be somewhere between 30 m and 500 m.
3. The path between the phased array and the measurement device should not be obstructed by any object. In other words, it should be in a Line-of-Sight position.
4. The measurement device should be set at a fixed position without any shaking or movement throughout the procedure. It can be mounted on a tripod to remain steady.

After setting up the measurement device, the GPS coordinates of the phased array ($GPS_{antenna}$) as well as the measurement device ($GPS_{device}$) are obtained and recorded (step 102).

A phased array includes many antennas placed next to each other with a given spacing. Each antenna is equipped with a variable gain amplifier and a phase shifter. By setting different amplitude and phase values for each antenna, the outgoing signal will have different radiation patterns. In other words, the transmitted signal will have higher power at some angles and lower power at other angles. Similarly, the sensitivity of the array to a received signal will be higher at some angles and lower at other angles. In either case, the radiation pattern and the sensitivity pattern is referred to as a "Beam". In this phase of the orientation finding procedure, a set of M beams, each generated through a distinct set of amplitude and phase shifts, is chosen (step 104). This set of beams is referred to as the "Beam Library".

Figure 3:
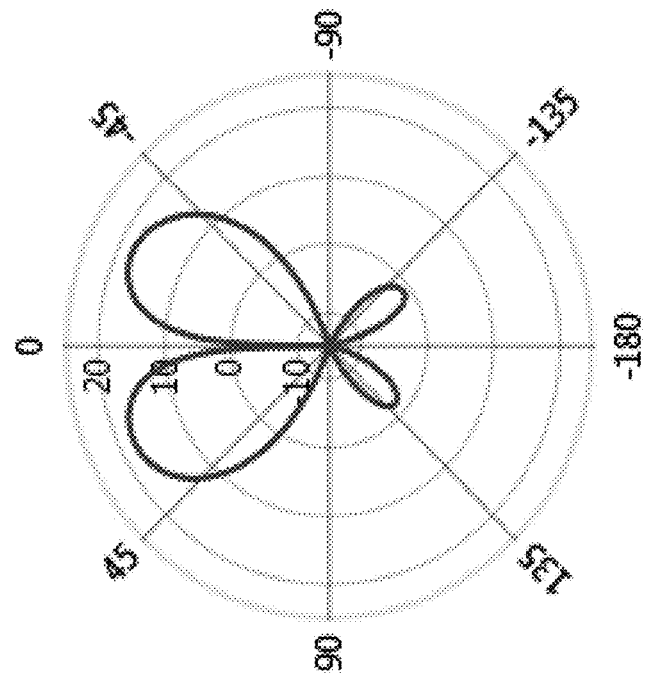
FIG. 3 illustrates the horizontal pattern of a "Null Beam" with the null pointing at zero degrees.
Figure 4A:
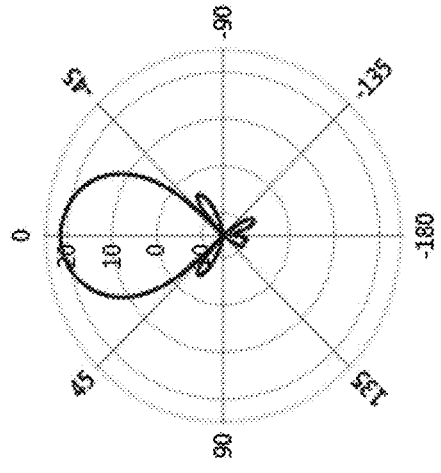
FIGS. 4A-C illustrate a sample set of beams for the beam library with minimal variations to avoid disrupting traffic.
Figure 4B:
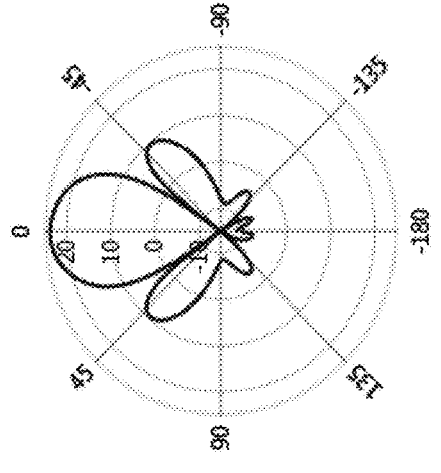
Figure 4C:
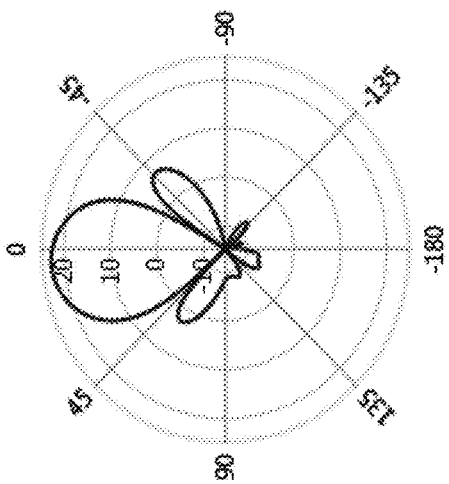
Figure 5A:
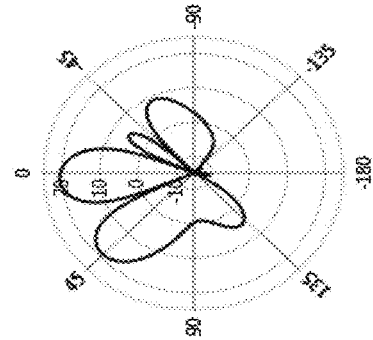
FIGS. 5A-E show an example of a Null beam that is swept over a range of angles to create a null beam library.
Figure 5B:
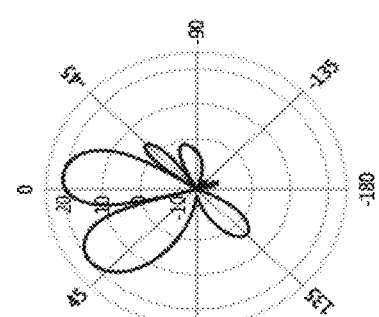
Figure 5C:
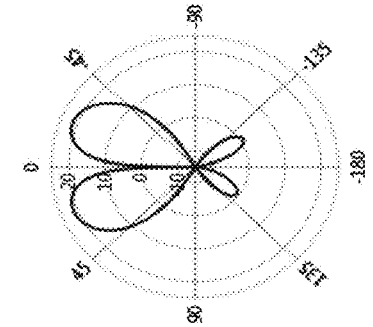
Figure 5D:
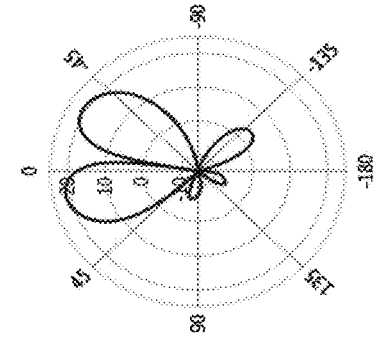
Figure 5E:
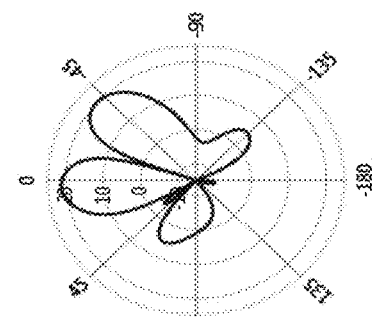

Conceptually, the algorithm will work with any arbitrary beam library. However, the performance of the orientation finding depends on the chosen beams. The following considerations should be taken into account to achieve better performance:
1. The more variability in array gain across the angles, the higher the accuracy of the orientation finding algorithm. A good choice for a beam to be used for orientation finding is the "Null Beam" shown in FIG. 3. In the illustrated example, the null is pointing at zero degrees. This has the desirable property that small changes in direction of the beam (i.e., the direction in which the null is pointed) will result in large changes in the array gain.
2. If the orientation finding procedure is performed in a cellular network carrying live traffic, it is desirable to not disrupt the ongoing traffic while the orientation finding is being performed. One way to achieve minimal impact on ongoing traffic is to choose beams for the beam library that are similar to the beam that is serving the network. For instance, the beam library can be populated with beams that are steered versions of the current beam with small angular variations. For example, if the current beam serving the network is a narrow beam pointing at 0 degrees azimuth, the beams of the library could be narrow beams pointing at −5, −4, . . . , 0, 1, . . . , 5 degrees azimuth. Another way of creating similar beams is to locally modify the shape of side-lobes of the current beam while keeping the general shape the same.
FIGS. 4A-C show an example of how beams can be generated that look similar, thus, minimize the impact on ongoing traffic. The leftmost beam (FIG. 4A) has no side lobes; the center beam (FIG. 4B) has side-lobes; and the rightmost beam (FIG. 4C) has slightly suppressed side-lobes and a minor shift in azimuth compared to the center beam.
3. The beams in the beam library can be steered versions of the same reference beam and do not need to be completely different in shape. In other words, one can generate the beam library by sweeping one beam across different angles. For instance, FIGS. 5A-E show how the Null Beam can be swept over a range of angles to create the beams for the beam library.
4. Although the figures so far only show beams moving in the azimuth direction, if the orientation finding entails finding both azimuth and elevation orientation angles, beams need to be added to the library that vary in the elevation domain as well.

With the beam library defined, a measurement phase is implemented during which measurements are taken while using the phased array to sequentially generate each of the beams from the beam library (phase 108). This step can be performed in two different ways, depending on whether it is being performed in a transmit mode (Tx mode) or in a receive mode (Rx mode). In the Tx mode, the phased array acts as the transmitter; the measurement device acts as the receiver; and the beams of the beam library are successively applied to the transmit port of the phased array. In the Rx mode, the phased array acts as the receiver; the device acts as the transmitter; and the beams of the library are successively applied on the receive port of the phased array. Obviously, for the Rx mode the device needs to be capable of transmission.

In the Tx mode, all beams in the beam library are applied on the transmit port of the phased array one after another. After each beam is applied, the phased array transmits a probe signal which is received by the device and the received power of the probe signal is recorded. Hence, for each beam, there will be one power reading. At the end, after all beams from the beam library have been generated, all measured power values are used to form a vector P (steps 110).

In the Rx mode, the same as the Tx mode, the beams of the library are successively applied on the receive port of the phased array. The device sends a probe signal that is received by the phased array. And the power of the received probe signal is recorded to again form a vector P (steps 110).

If the phased array is used in an isolated setting, the signal that can be used for each of the above modes can be arbitrary. A suitable waveform to be used might be a simple tone. The frequency channel used for the transmission should be one without interference, i.e., no other transmitter in the vicinity of the phased array and the measurement device should be transmitting in the same frequency channel.

If the phased array is used in a cellular network, in the Tx mode, the cell specific reference signals can be used. Periodic reference signals are transmitted by base stations in cellular networks. In order to use the reference signal for orientation finding, the measurement device must be able to read the reference signal. Also, the device must be able to only listen to the reference signals coming from the cell that has the phased array whose orientation is to be found (all commercial mobile phones can do both tasks). The device then measures the power of the received reference signal, which is called RSRP (Reference Signal Received Power). The RSRP value can be used to create the vector P.

In the Rx-mode, a similar approach can be adopted where the device (a mobile phone will work here too) connects to the network and transmits a given signal. Along with the signal, the phone also transmits pilot signals. The cell measures the received power of the pilot signals.

Figure 6:
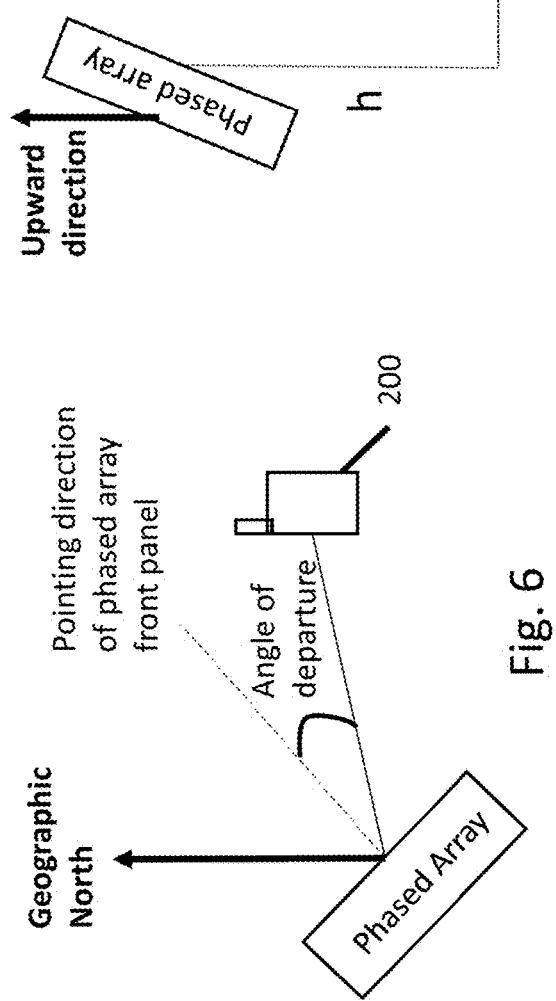
FIG. 6 illustrates the azimuth component of the angle of departure.

In the next phase, the angle of arrival/departure of the signal (illustrated in FIG. 6) is determined. If the previous step is performed in the Tx mode, the angle is called angle of departure, whereas in the Rx mode it is called angle of arrival. Without losing generality, it will be referred to as angle of departure for the remainder of this description. In any case, the angle of departure is the angle between the pointing direction of the phased array front panel and the direction from the phased array to the measuring device. FIG. 6 illustrates the azimuth component of the angle of departure. Similarly, there is also the elevation component.

In order to obtain the angle of departure, a pattern recognition algorithm, such as the least squares estimation described below, is used (step 112).

To perform pattern recognition, a range of azimuth and elevation angle hypotheses for the angle of departure are defined (step 106). A hypothesis means the angle which is "guessed" to be the correct angle of departure in azimuth and elevation. The job of the pattern recognition algorithm is to determine which hypothesis is the most likely angle of departure. For instance, the hypothesis set for the orientation finding procedure can be chosen to be the set (−40, −39.5, −39, . . . , 0, 0.5, 1, . . . , 29.5, 30) degrees in azimuth and (0, 1, . . . , 10) degrees in elevation. Hence, the outcome of the pattern recognition will be one azimuth and one elevation angle value out of the above sets which the algorithm estimates to be the correct azimuth and elevation angles of departure. The range and granularity of the above sets is arbitrary, but the wider the range and finer the granularity, the more accurate the outcome can become.

For every possible hypothesis $(\hat{\varnothing}, \hat{\theta})$, where $\hat{\varnothing}$ and $\hat{\theta}$ represent the azimuth and elevation angle hypothesis, respectively, and for every beam i from the beam library, the array gain $G_i(\hat{\varnothing}, \hat{\theta})$ is calculated (step 108). $G_i(\hat{\varnothing}, \hat{\theta})$ is the phased array gain observed by beam i if the correct angle of departure was $(\hat{\varnothing}, \hat{\theta})$. There are well known, standard mathematical formulae for performing such calculations that take the antenna characteristics and frequency as input.

Next, a vector $G(\hat{\varnothing}, \hat{\theta}) = (G_1(\hat{\varnothing}, \hat{\theta}), G_2(\hat{\varnothing}, \hat{\theta}), \ldots G_M(\hat{\varnothing}, \hat{\theta}))$ is defined. It is simply the set of calculated array gains for the complete set of beams within the beam library.

To perform a least squares estimation, the scalars $\alpha(\hat{\varnothing}, \hat{\theta})$ and $\beta(\hat{\varnothing}, \hat{\theta})$ for every hypothesis $(\hat{\varnothing}, \hat{\theta})$ are calculated as follows:

$$\alpha(\hat{\varnothing}, \hat{\theta}) = \max\left\{\frac{\sum_i G_i(\hat{\varnothing}, \hat{\theta}) \sum_i P_i - M \sum_i G_i(\hat{\varnothing}, \hat{\theta}) P_i}{\left(\sum_i G_i(\hat{\varnothing}, \hat{\theta})\right)^2 - M \sum_i G_i^2(\hat{\varnothing}, \hat{\theta})}, 0\right\}$$

$$\beta(\hat{\varnothing}, \hat{\theta}) = \frac{1}{M} \sum_i \left(P_i - \alpha(\hat{\varnothing}, \hat{\theta}) G_i(\hat{\varnothing}, \hat{\theta})\right)$$

where $P_i$ is the measured RSRP using beam pattern i, and M is the total number of beam patterns used.

Then, an error calculation is performed. For every hypothesis $(\hat{\varnothing}, \hat{\theta})$, the vector $\hat{P}(\hat{\varnothing}, \hat{\theta})$ and the error $\varepsilon(\hat{\varnothing}, \hat{\theta})$ are calculated as follows:

$$\hat{P}(\hat{\varnothing},\hat{\theta})=\alpha(\hat{\varnothing},\hat{\theta})G(\hat{\varnothing},\hat{\theta})+\beta(\hat{\varnothing},\hat{\theta})$$

$$\varepsilon(\hat{\varnothing},\hat{\theta})=\Sigma_i(P_i-\hat{P}_i(\hat{\varnothing},\hat{\theta}))^2$$

Once these calculations are completed for all hypotheses, the hypothesis for which the error is the smallest is selected as the correct angle of departure referred to as $(\hat{\varnothing}^*, \hat{\theta}^*)$.

Using the GPS coordinates of the phased array and the measurement device, the geographical angle between the two with respect to geographic north ($\varnothing_{final}$ for azimuth) and with respect to direction normal to the ground ($\theta_{final}$ for elevation) is determined (step 114).

This is done as follows.

To calculate azimuth, both GPS coordinates from Latitude-Longitude format are first transformed to UTM format to determine the Easting and Northing coordinates for both phased array and device. The outcome of this step will be: ($N_{array}$, $E_{array}$), and ($N_{device}$, $E_{device}$). Note that the transform from GPS coordinates to UTM is a well-known standard method.

Then, $\psi$ is calculated as follows:

$$\psi = \tan^{-1}\left(\frac{N_{array} - N_{device}}{E_{array} - E_{device}}\right)$$

Figure 7:
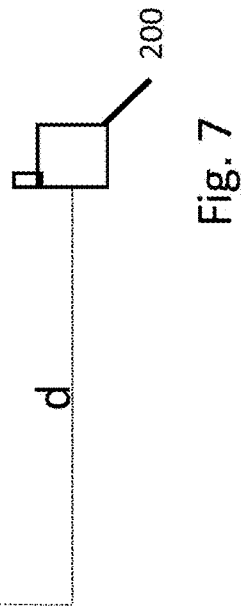
FIG. 7 depicts a side view of a phased array for the purpose of illustrating the height and distance parameters.

To calculate elevation, the ground distance between the device and the phased array d, as well as the height difference between the two h are measured (refer to FIG. 7). The height difference should be measured in terms of the altitude of the phased array subtracted by the altitude of the device. Hence, if the device is located at a higher altitude than the phased array, h will be negative.

Then, $\varphi$ is calculated as follows:

$$\varphi = \tan^{-1}\left(\frac{h}{d}\right)$$

The final values for the azimuth $\varnothing_{final}$ and elevation $\theta_{final}$ orientation angles are derived as follows. All values are in degrees:

$$\varnothing_{final} = 90 - \varnothing^* - \psi$$

$$\theta_{final} = 90 - \theta^* - \varphi$$

Figure 8:
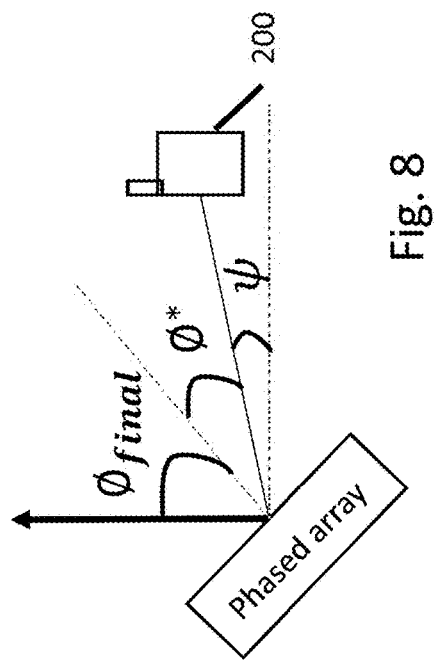
FIG. 8 illustrates how the angle of departure and the geographic azimuth angles are used to find the azimuthal orientation of the phased array.

FIG. 8 illustrates the different components that make up the final azimuth orientation angle. The elevation angle can be illustrated in a similar manner.

After the final orientation values are derived, the system operator uses the derived orientation values to perform RF-planning, network and/or system level simulations for the phased array (step 116).

In the above-described embodiment, calculating the array gains for the beams of the beam library, operating the phased array, acquiring the measurements of received power, performing pattern recognition, and determining the orientation angles of the phased array may be computer or processor implemented or controlled. Indeed, for many of these operations it would be impractical to not implement them with the aid of a computer or processor system.

Other embodiments are within the following claims. For example, metrics other than RSRP could be used such as SINR (Signal-to-Interference plus Noise Ratio) among others. In addition, instead of using a least squares algorithm, one could use other pattern matching algorithms such as those based on cross-correlation, parameter estimation, or machine learning, to name a few.

In addition, the procedure can be performed while panel is in full operation mode and while traffic is being transmitted as usual. It can be applied to both FDD (Frequency Division Duplex) and TDD (Time Division Duplex) systems. In case of MIMO, one or multiple ports can be used for the algorithm.

An extension of the orientation finding mechanism, if used in a cellular network, is that instead of placing a measurement device somewhere close to the phased array, another cell can act as the device. That case is similar to the Rx mode except that instead of using a transmit device on the ground, one of the cells is used for this purpose.

Also, the procedure can be performed on multiple locations to increase certainty in final result. For example, one can perform the procedure in four different locations and the results examined to determine what is the best answer. In this case, assume that three out of four locations yield 30 degrees and one location yields 25 degrees. The procedure would output 30 degrees as the right answer.

In addition, for each location, a separate set of beam patterns and a different pattern matching algorithm can be used depending on the characteristics of that location.

Furthermore, to account for irregular channel impairments, each beam pattern can be applied multiple times. The final RSRP reading for beam pattern will be the average of all readings for that beam pattern.

What is claimed is:

1. A method of determining an orientation of a phased array antenna, said method comprising:
    positioning a communication device in front of the phased array antenna;
    with the phased array antenna, sequentially generating each beam pattern of a library of multiple beam patterns;
    for each of the sequentially generated beam patterns from the library of multiple beam patterns, and by using either the phased array antenna or the communication device, measuring a received signal parameter, wherein the received signal parameters for the library of multiple beam patterns form a measured received signal vector for the phased array antenna; and
    determining the orientation of the phased array antenna by comparing the measured received signal vector for the phased array antenna to each of a plurality of calculated received signal vectors.

2. The method of claim 1, further comprising determining location coordinates for the communication device and for the phased array antenna.

3. The method of claim 1, wherein each calculated received signal vector of the plurality of calculated received signal vectors corresponds to a different hypothesized orientation for the phased array antenna.

4. The method of claim 3, further comprising for each hypothesized orientation of a plurality of hypothesized orientations for the phased array antenna, using the beam library to compute the corresponding calculated received signal vector for that hypothesized orientation.

5. The method of claim 1, wherein the library of multiple beam patterns is a library of multiple transmit beam patterns.

6. The method of claim 5, wherein the communication device is a receiving device.

7. The method of claim 6, wherein measuring the received signal parameter is performed at the communication device.

8. The method of claim 1, wherein the library of multiple beam patterns is a library of multiple receive beam patterns.

9. The method of claim 8, wherein the communication device is a transmitting device.

10. The method of claim 9, wherein measuring the received signal parameter is performed at the phased array antenna.

11. The method of claim 1, wherein determining the orientation of the phased array antenna involves comparing the measured received signal vector for the phased array antenna to each calculated received signal vector of the plurality of calculated received signal vectors to determine an angle of departure or arrival for the phased array antenna.

12. The method of claim 11, wherein determining the orientation of the phased array antenna involves converting the angle of departure or arrival for the phased array to the orientation of the phased array antenna.

13. The method of claim 1, wherein comparing the measured received signal vector for the phased array antenna to each calculated received signal vector of the plurality of calculated received signal vectors involves finding which calculated received signal vector among the plurality of calculated received signal vectors yields a best fit with the measured received signal vector.

14. The method of claim 13, wherein comparing the measured received signal vector for the phased array antenna to each calculated received signal vector of the plurality of calculated received signal vectors employs a least squares technique.

15. The method of claim 1, wherein comparing the measured received signal vector for the phased array antenna to each calculated received signal vector of the plurality of calculated received signal vectors involves employing a pattern matching algorithm.

16. The method of claim 1, wherein the received signal parameter is RSRP (Reference Signal Received Power).

17. The method of claim 1, wherein the received signal parameter is SINR (Signal-to-Interference plus Noise Ratio).

18. The method of claim 1, further comprising:
    defining the library of multiple different beam patterns; and
    storing the library of multiple different beam patterns.

* * * * *